Patented Jan. 16, 1951

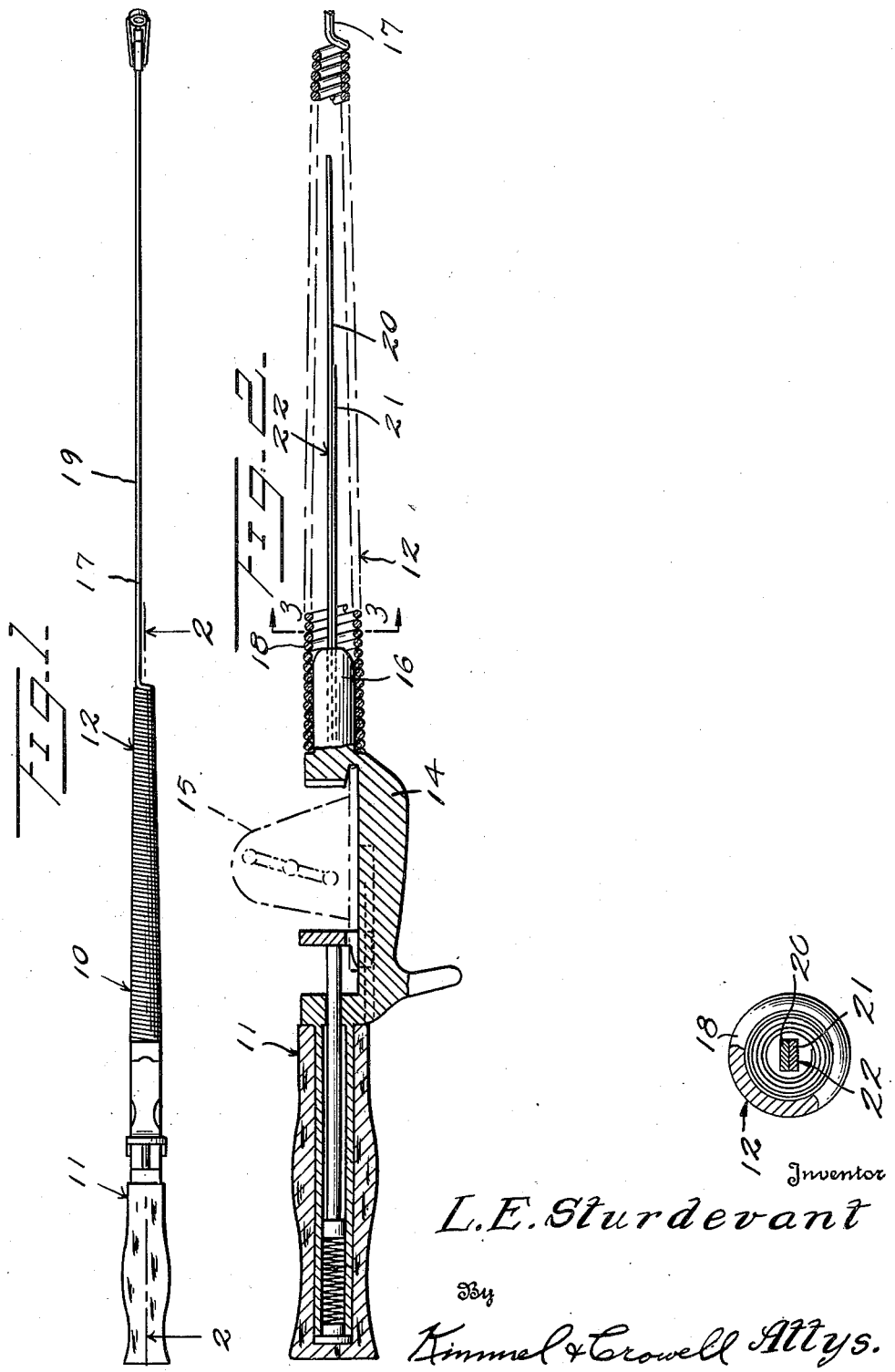

2,538,338

UNITED STATES PATENT OFFICE 2,538,338

CASTING ROD

Lyn E. Sturdevant, Butler, Pa., assignor to Baird-Sturdevant Company, Inc., Butler, Pa.

Application November 17, 1947, Serial No. 786,513

5 Claims. (Cl. 43—18)

This invention relates to fishing rods, and more particularly to an improved casting rod.

It is an object of this invention to provide an improved casting rod of the kind to be more particularly described hereinafter, with the use of which an angler may be able to cast the fishing line in a straight path with the maximum force to obtain the greatest possible distance.

A further object of this invention is to provide a resilient rod of this kind so constructed and arranged to provide for a very sensitive rod to enable the angler to accurately determine the correct time to strike or set the hook in a fish.

Another object of this invention is to provide a fishing or casting rod of this kind in which one end of a coiled spring is extended to provide the actual rod or shaft portion of the fish rod and the inner coiled end of the spring is attached to the handle or stock of the rod. Such an arrangement provides for the ready manufacture of this form of casting rod with the minimum amount of labor and machinery as the greater length of the assembled rod is formed of a single length of wire.

With the above and other objects in view, my invention consists in the arrangement, combination and details of construction disclosed in the drawings and specification, and then more particularly pointed out in the appended claims.

In the drawing,

Figure 1 is a top plan view of a fishing rod constructed according to an embodiment of this invention, Figure 2 is a longitudinal section taken on the line 2—2 of Figure 1, Figure 3 is a sectional view taken substantially along the line 3—3 of Figure 2 as viewed in the direction indicated by the arrows.

Referring to the drawing, the numeral 10 designates generally an improved fishing or casting rod so constructed and arranged as to provide a substantially rigid handle 11 and a resilient shaft 12. The handle 11 is formed of wood or other suitable material, having a central downwardly offset portion 14 above which the reel 15 is adapted to be supported.

The shaft 12 is secured to the front end of the handle 11 and may be bent forwardly of its attachment thereto. The handle 11 is provided with a cylindrical forwardly extending supporting element portion or lug 16 with which the resilient shaft 12 is adapted to be engaged. The lug 16 being cylindrical and the coil 18 being tapered, a tight frictional engagement is obtained between these two when the coil is forced onto the lug thus giving the appearance of a cylindrical shape of the coil on the lug. The shaft 12 is formed of an elongated length of wire 17, bent upon itself at the rear end thereof to form an elongated spring coil 18.

The coil 18 is formed of closely abutting convolutions of the wire 17, and the convolutions or loops of the coil diminish in diameter from the rear end of the handle forwardly, providing a substantially frustro-conical coil. The divergent or rear end of the coil 18 is adapted to engage resiliently about the lug 16 for securely attaching the shaft 12 thereto. The forward or extreme front end of the wire 17 is straight, as indicated by the numeral 19 in Figure 1, to provide the straight forwardly extending end of the shaft.

The forward extension 19 extends substantially along the axis of the coil 18 and lug 16. A pair of flat springs 20 and 21 are secured at one end in the lug 16 and extend forwardly therefrom. The flat spring 22 formed by the springs 20 and 21 extends forwardly from the handle into the coil 18. The spring 22 is normally spaced from the inner surface of the coil 18 and is adapted to be moved into engagement with the coil upon flexing of the shaft 12. The longer flat spring 20 extends beyond the outer end of the shorter flat spring 21 to provide for the addition of increased spring tension to resist the flexing of the shaft 12. With this disposition of the coil spring 18, and the flat spring 22, as the shaft 12 is bent due to the weight exerted at the end thereof, the spring tension resisting this flexing of the shaft will be increased as the flexing or weight is added.

I do not mean to confine myself to the exact details of construction herein disclosed, but claim all variations falling within the purview of the appended claims.

Having thus described my invention, what I claim is:

1. An improved casting rod comprising a handle, a lug on the front end of said handle, a resilient shaft on said handle formed of a single length of wire bent upon itself at one end thereof to form a conical outwardly tapering coiled inner end and having an elongated straight outer end, said lug engageable in the inner divergent open end of said coiled end for securing said shaft on said handle and an elongated flat spring fixed at one end in said lug and extending into said coiled inner end, said flat spring being normally spaced inwardly from the inner surface of said coiled end of said shaft and adapted to engage said coiled end after initial bending thereof to impart additional stiffness thereto.

2. A casting rod comprising a handle, a forwardly extending lug on said handle, a resilient shaft on said handle formed of a single length of wire having an elongated straight outer end and a closely coiled hollow elongated inner end, said lug engageable in the hollow of said coiled end, and an elongated flat spring fixed at one end to said lug and extending within said coiled end and normally spaced inwardly therefrom for stiffening said shaft after initial bending thereof on said coiled end.

3. A casting rod comprising a handle having a seat adapted for the reception of a reel, a supporting element portion in advance of the seat and a single length of resilient wire-like metal formed with a closely coiled inner end comprising a resilient tapered coiled spring and an elongated straight outer end section integral with and comprising in entirety an extension of said coiled inner end and having a line guide mount secured at an end thereof, and means for securing said coiled inner end embracingly to the supporting element portion of said handle.

4. In a casting rod for fishing, a handle and a rod portion, said handle having at one end a lug of smaller cross sectional area than the adjacent portion of the handle, said rod portion being mounted on the lug, said rod portion comprising a coiled spring tapering throughout its coil length, with one coil abutting an adjacent portion of the handle and another coil having an end thereof merging into a straight section having an outer surface lying in a plane coincident with a plane tangent to the outer surface of the tapered coil length, and a line guide mounting secured to the free end of the straight section.

5. A fishing rod section comprising a single length of resilient wire-like metal formed with a closely coiled end portion comprising a resilient tapered coiled spring and an elongated straight portion integral with and comprising in entirety an extension of said coiled end portion, said coiled end portion adapted to embracingly secure said section to a supporting part of a fishing rod handle for supporting said section and said straight portion adapted to have a line guide mount secured at the free end thereof.

LYN E. STURDEVANT.

REFERENCES CITED

The following references are of record in the file of this patent:

UNITED STATES PATENTS

| Number | Name | Date |
|---|---|---|
| 289,033 | Shattuck | Nov. 27, 1883 |
| 372,165 | Monce | Oct. 25, 1887 |
| 712,984 | Walker | Nov. 4, 1902 |
| 735,471 | Crane | Aug. 4, 1903 |
| 1,593,957 | Shaver | July 27, 1926 |
| 2,155,992 | Menachof | Apr. 25, 1939 |
| 2,182,901 | Moulton | Dec. 12, 1939 |
| 2,289,216 | Seidel | July 7, 1942 |
| 2,351,734 | Backe | June 20, 1944 |

FOREIGN PATENTS

| Number | Country | Date |
|---|---|---|
| 20,882 | Sweden | May 19, 1906 |